United States Patent [19]

Okuyama et al.

[11] Patent Number: 4,608,637
[45] Date of Patent: Aug. 26, 1986

[54] CONTROL DEVICE FOR DRIVING ROAD-VEHICLE ELECTRIC-POWERED EQUIPMENT

[75] Inventors: Teiji Okuyama, Toyota; Hiroshi Noutomi, Yokohama, both of Japan

[73] Assignee: Aisin Seiki Kabushiki Kaisha, Aichi, Japan

[21] Appl. No.: 537,619

[22] Filed: Sep. 30, 1983

[30] Foreign Application Priority Data

Sep. 30, 1982 [JP] Japan ................................ 57-172964

[51] Int. Cl.$^4$ ........................ G06F 15/20; G06D 3/20
[52] U.S. Cl. .................................. 364/424; 318/466; 318/103; 364/140; 307/140
[58] Field of Search ............... 364/424, 715, 425, 140; 340/52 F; 318/102, 652, 103, 596, 444, 443, 446, 447, 452, 466; 200/1 R; 307/139, 140, 141

[56] References Cited

U.S. PATENT DOCUMENTS

| | | | |
|---|---|---|---|
| 4,013,875 | 3/1977 | McGlynn | 364/424 |
| 4,204,255 | 5/1980 | Cremer | 364/715 |
| 4,306,218 | 12/1981 | Leconte et al. | 364/424 |
| 4,328,451 | 5/1982 | Barge | 318/596 |
| 4,463,426 | 7/1984 | Caddick et al. | 364/424 |
| 4,481,585 | 11/1984 | Huntzinger et al. | 364/424 |

*Primary Examiner*—Felix D. Gruber
*Assistant Examiner*—Thomas G. Black
*Attorney, Agent, or Firm*—Sughrue, Mion, Zinn, Macpeak & Seas

[57] ABSTRACT

Automatic opening/closing control of side windows of a vehicle. An electronic control device mainly composed of a microcomputer reads respective time-serial opening/closing patterns of key switches. These time-serial opening/closing patterns are respectively allocated to commands sent to the electronic control device. The electronic control device controls driving of the opening/closing mechanism for each side window in accordance with the commands. The electronic control device further effects overload detection of the opening/closing mechanism, limit position detection in movement thereof as well as arithmetic operation of the actual position, and then stops driving of the opening/closing mechanism at the time when the opening/closing mechanism undergoes overload and at the time when the actual position reaches the goal position.

8 Claims, 25 Drawing Figures

Switch OFF

Up Switch ON

Switch OFF
(Returned State)

Down Switch ON

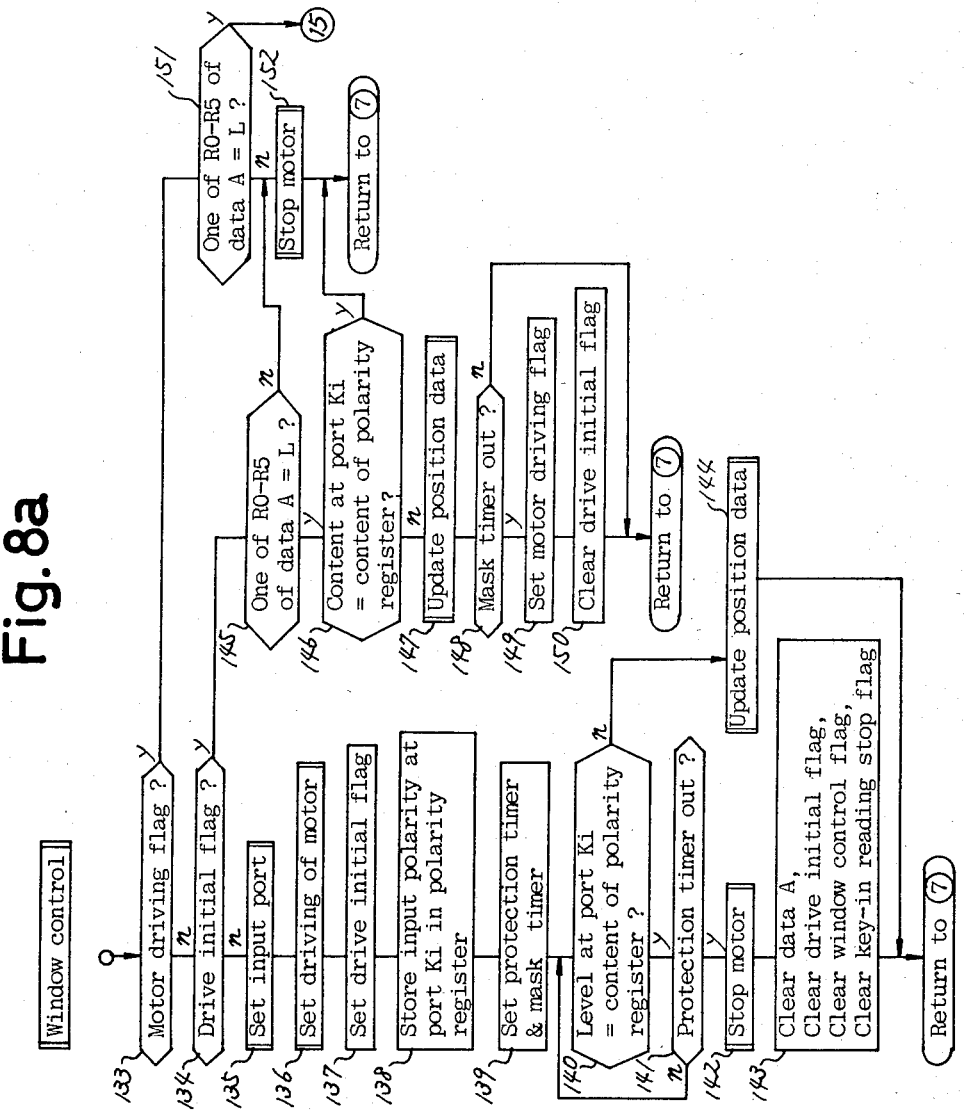

CONTROL DEVICE FOR DRIVING ROAD-VEHICLE ELECTRIC-POWERED EQUIPMENT

BACKGROUND OF THE INVENTION

This invention relates to position control that permits attitude setting or positioning of one or more road-vehicle electric-powered mechanisms such as road-vehicle side windows, roof panels, seats and mirrors, and more particularly to actuation control for such electric-powered mechanisms in response to operation of switch means adapted to instruct driving of the mechanism.

In some vehicles, side windows (i.e., windows in the doors adjacent to the driver's seat and the assistant driver's seat as well as rear of the driver's seat and the assistant driver's seat), sunroofs (or roof panels), seats, mirrors outside and inside the vehicles, etc. are arranged to be driven electrically. In one example of such a vehicle, as disclosed in U.S. Pat. No. 2,848,218 of J. D. LESLIE et al, control switches are provided to selectively close an actuating circuit for forward and reverse rotation of a motor thereby to drive the motor. In another example, as disclosed in U.S. Pat. No. 4,204,255 of H. P. Cremer and UK Patent Application No. GB 2060944A of G. R. Caddick et al, an electronic control device having an advanced arithmetic function, such as a microcomputer, is used as a central control unit to monitor the current position of a movable object, so that the movable object is located at the position instructed by key switch operation.

The latter example is constructed as follows, for instance. A plurality of switches and motor drivers for electric-powered driving mechanisms are connected to the electronic control device such as a microcomputer, those among the switches adapted for designation of mechanism being operated to specify the electric-powered mechanism to be controlled and the remaining switches adapted for designation of goal position being operated to instruct the goal position in driving. Stated differently, a plurality of switches and a set of microcomputers are used to carry out both position instruction and positioning control of plural electric-powered mechanisms.

However, the prior art of this kind has encountered such problems that the number of switch means adapted to designate both electric-powered mechanism and position is increased and it is inconvenient to select the desired switch, and that the electronic control device such as a microcomputer requires many input/output ports used for reading the switches, thus resulting in the complicated structure and the higher cost of the device.

SUMMARY OF THE INVENTION

It is an object of this invention to reduce the number of switch means required for instruction of electric-powered actuation control.

To achieve the above object, this invention is so designed that the instruction content for an electric-powered mechanism and/or driving position, etc. is represented by a time-serial opening/closing pattern of switch operation, an electronic control device such as a microcomputer reads such a time-serial opening/closing pattern generated by operation of the desired switch to judge the instruction of the switch operation, and the electric-powered mechanism specified by the switch operation is controlled to be positioned in the instructed position.

In the road-vehicle electric-powered equipment thus arranged, there arise such problems as follows. If any substance rides on the movable object or some part of the human body obstructs the movement thereof, or if any foreign matter is caught in the driving mechanism, the mechanism will not move smoothly in spite of the continued actuation of the motor. This results in that the driving source may be subject to overload, or that the person or the mechanism may be damaged. Further, due to wear and rattling of the mechanism components, the movable members tend to be positioned incorrectly with the lapse of time.

Therefore, in a control device for driving road-vehicle electric-powered equipments wherein a signal generator such as a rotary encoder adapted to issue an electric signal undergoing level changes in conjunction with a mechanical movement is coupled to the electric-powered driving mechanism, the electronic control device such as a microcomputer (or microprocessor) counts the level changes in the electric signal to measure the current position of a movable member, and a motor is driven in such direction that the counted value is made coincident with the position instructed by switch operation, a preferred embodiment of this invention is featured in that when the given condition such as power input to the electronic control device or the predetermined operation of the given switch is met, the motor is driven to rotate forwardly or reversely and the limit position of the movable member is detected with the load imposed on the movable member thereby to attain the required information on its position. With this, since the information on limit position is updated each time, there occurs no shift in positioning with the lapse of time.

Normally, actuation of the electric motor is instructed by operation of the switch means, the level changes in the electric signal are monitored during such actuation, the information on current position is obtained based on the information on movement limit position, the rotating direction of the electric motor and the number of level changes, reference data stored in a semiconductor memory and corresponding to the position is read out and compared with the load of the electric motor, and the actuation of the electric motor is stopped when the load exceeds a predetermined value which is determined by the reference data. With this, if any substance or some part of the human body comes into contact with the movable member and the resultant load becomes larger than the normal value, the motor stops its rotation so that the contacting substance or part and the electric-powered driving mechanism may be prevented from being damaged. Also when the load is increased upon reaching of the movable member to the limit position, the motor stops its rotation similarly. Further, when the information on current position indicates the limit position, the motor is stopped too.

In a preferred embodiment of this invention, the reference data corresponding to positions is divided into two groups, one of them being referred to when the road-vehicle equipment is moved between the first limit position and the constant load changing position and the other group being referred to when the road-vehicle equipment is moved between the constant load changing position and the second limit position, and the electronic control device actuates the electric motor to be driven forwardly or reversely in accordance with establishment of the given condition such as power input to the device itself or operation of the given switch, obtains the information on constant load changing position where there causes a load change in the electric motor smaller than that at the limit position of the road-vehicle equipment, while attaining the information on limit position as to the movement of the road-vehicle equipment, and switches the reference data upon crossing the border of the constant load changing position from one to another data which is referred to for detection of overload. With this, it becomes possible for even a movable member undergoing constant load changes between the two limit positions (i.e., the fully-closed and fully opened positions) to be stopped with overload in a stable and safe manner without possibility of erroneous stopping. For example, when window glass is closed from the opened state in the side windows, the motor load starts to be increased immediately after the leading end of the window glass comes into abutment with a weather strip, but the motor is stopped first when the window glass is further raised up and the weather strip has been compressed completely.

In case the electric-powered driving mechanism is stopped and then started to move at an arbitrary point between the two limit positions, a motor current necessary for the motor to start from such point becomes so much larger than that necessary for the motor to pass through the point at a steady speed. It is preferable that such a state is not detected as the overload state. In a preferred embodiment of this invention, therefore, the above-mentioned overload detection is not effected for a predetermined time from starting-up of the motor until the motor reaches a steady speed. This predetermined time is a very short period of time.

Other objects and features of the invention will become apparent from the following description given with reference to the drawings.

BRIEF DESCRIPTION OF THE DRAWINGS

FIG. 4c is a perspective view showing an external appearance of one of window opening/closing instruction switches 11 through 17 shown in FIG. 4a;

FIGS. 6a, 6b and 6c are flow charts showing the key-in reading operation of a microcomputer 9 shown in FIG. 4a;

FIGS. 7a, 7b, 7c and 7d are flow charts showing the reference point deciding control operation of the microcomputer 9 shown in FIG. 4a; and FIGS. 8a and 8b are flow charts showing the window opening/closing control operation of the microcomputer 9 shown in FIG. 4a.

DESCRIPTION OF PREFERRED EMBODIMENT

In the following, there will be described a preferred embodiment of this invention which is applied to opening/closing driving control for a road-vehicle side window.

Figure 1A:
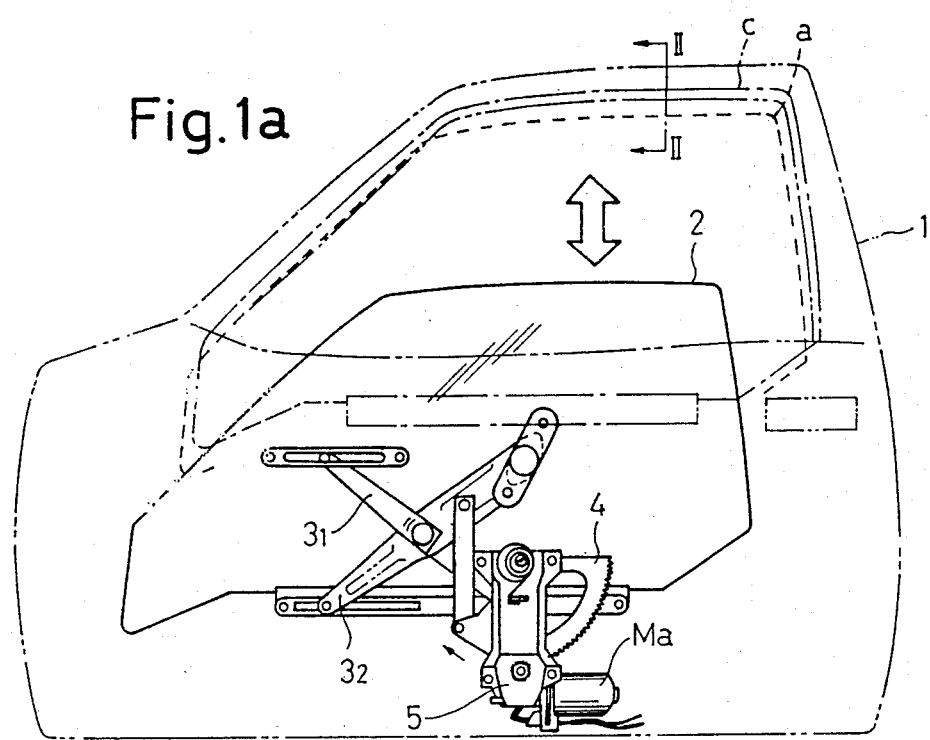
FIG. 1a is a side view of a mechanism section according to one embodiment of this invention, showing an electric-powered window opening/closing mechanism for the assistant driver seat of a vehicle.

FIG. 1a shows an electric-powered mechanism adapted to drive window glass 2 in a left-side door 1 i.e., the passenger side of a right-hand drive automotive vehicle, upwardly and downwardly.

Figure 1B:
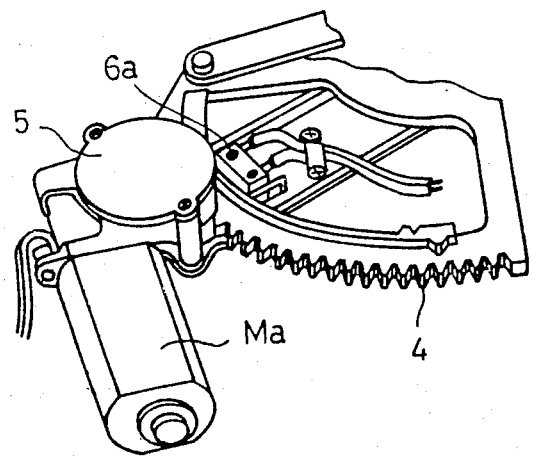
FIG. 1b is an enlarged perspective view of a part of the electric-powered window opening/closing mechanism.
Figure 1C:
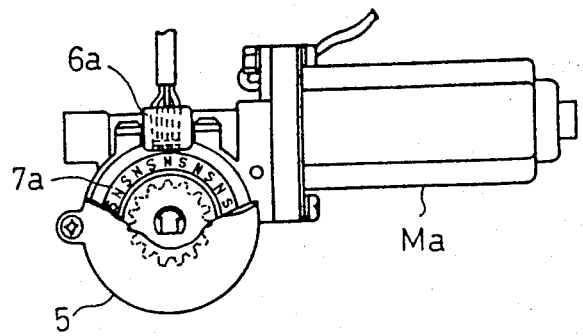
FIG. 1c is an enlarged plan view of a part of the electric-powered window opening/closing mechanism.
Figure 2A:
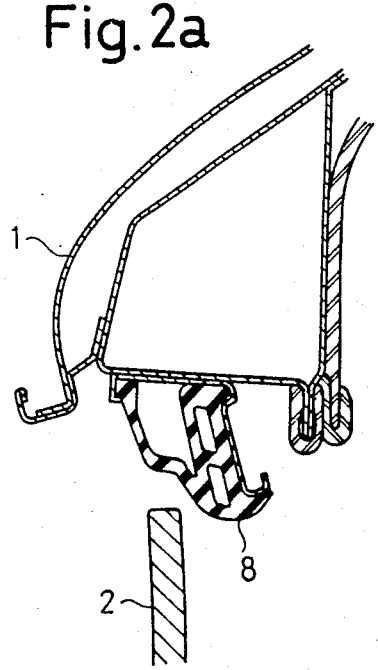
FIGS. 2a, 2b, 2c and 2d are partial sectional views showing the relationship between window glass 2 and a weather strip 8.
Figure 2B:
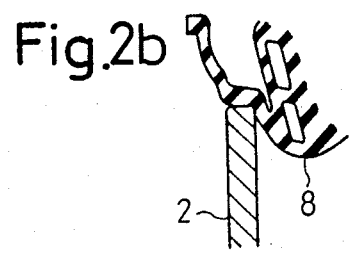
Figure 2C:
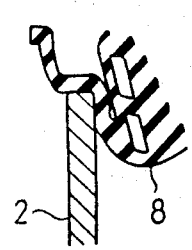
Figure 2D:
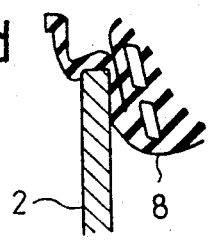
Figure 3A:
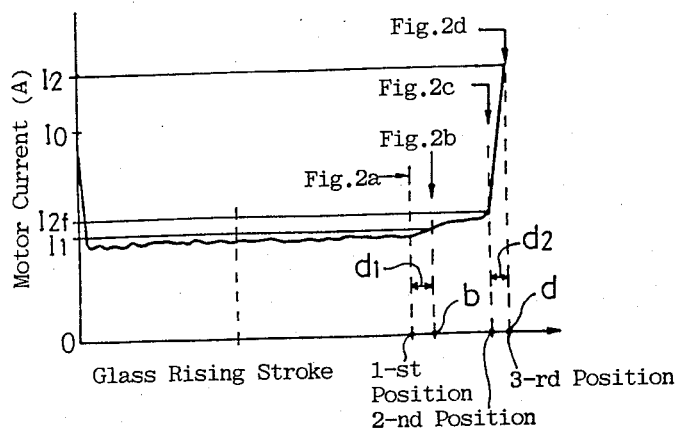
FIG. 3a is a graph showing an actuating current of an electric motor for driving the window glass 2 at the time of upward driving thereof.
Figure 3B:
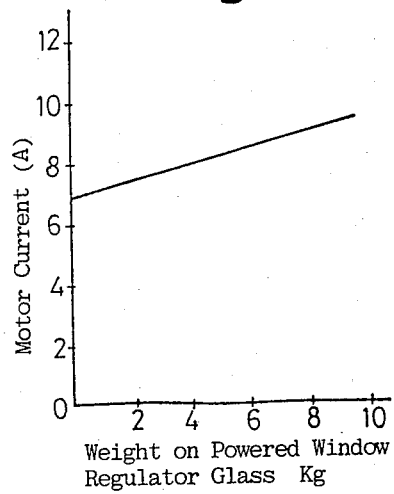
FIG. 3b is a graph showing the relationship between the actuating current and the load of the motor.

Pins at one-side ends of link arms $3_1$ and $3_2$ are respectively coupled to upper and lower guide rails rigidly mounted to the window glass 2, and an elevating arm engaged with the other end of the link arm $3_2$ is driven upwardly and downwardly by a sector-like gear 4 coupled to the elevating arm. The sector-like gear 4 is in mesh with a wheel of a worm and wheel assembly 5, and a rotary shaft of an electric motor Ma is coupled to the worm in mesh with the wheel. With this arrangement, when the motor Ma rotates forwardly, the sector-like gear 4 is turned in the clockwise direction in FIG. 1a to push up the window glass 2. When the motor Ma rotates reversely, the sector-like gear 4 is turned in the counterclockwise direction to lower the window glass 2. In the worm and wheel assembly 5, a ring-shaped permanent magnet 7a (FIG. 1c) is rigidly mounted onto a rotary disk fixed to the wheel shaft, while a Hall IC unit 6a in which a Hall element and an electric circuit adapted to process a magnetic field detection signal generated from the Hall element are integrated into a unitized structure, is disposed at the outer side of the permanent magnet 7a facing it. The permanent magnet 7a is magnetized in a polarized manner in the circumferential direction, so that the Hall IC unit 6a generates a sinusoidal electric signal as the wheel is rotated. FIG. 1b shows a combination of the sector-like gear 4 and the worm and wheel assembly 5, while FIG. 1c shows a combination of the permanent magnet 7a in the worm and wheel assembly 5 and the Hall IC unit 6a. In the state where the motor Ma is driven to rotate forwardly to push up the window glass 2, when the leading end of the glass 2 has not yet reached a weather strip 8 as shown in FIG. 2a, a level of motor current is low and its fluctuation is small. But when the glass 2 is raised up and comes into abutment with the weather strip 8, as shown in FIG. 2b, the motor current (i.e., motor load) is increased from that time. And when the weather strip 8 starts to be compressed as shown in FIG. 2c, the motor current is further increased. Finally, when the weather strip 8 is compressed completely as shown in FIG. 2d, the electric-powered mechanism is stopped and the motor current is abruptly increased. FIG. 3a shows a change in the current of the motor Ma in driving the window glass 2 from the fully-opened state to the fully-closed state shown in FIG. 2d. As is well known, a level of the motor current corresponds to the mechanical load of the motor and there exists a proportional relationship therebetween, as shown in FIG. 3b.

Doors adjacent to the driver's seat and to the rear of the driver's seat, as well as to the rear of the front passenger seat, are respectively equipped with electric-powered driving mechanisms of the same structure as the foregoing electric-powered driving mechanism. An electric motor for each of the electric-powered driving mechanisms also exhibits a similar characteristic to the foregoing one.

Figure 4B:
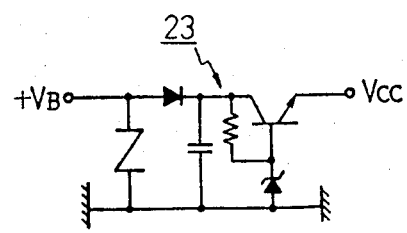
FIG. 4b is an electric circuit diagram showing a constant-voltage power supply circuit adapted to apply voltage Vcc to the electric control system.
Figure 4A:
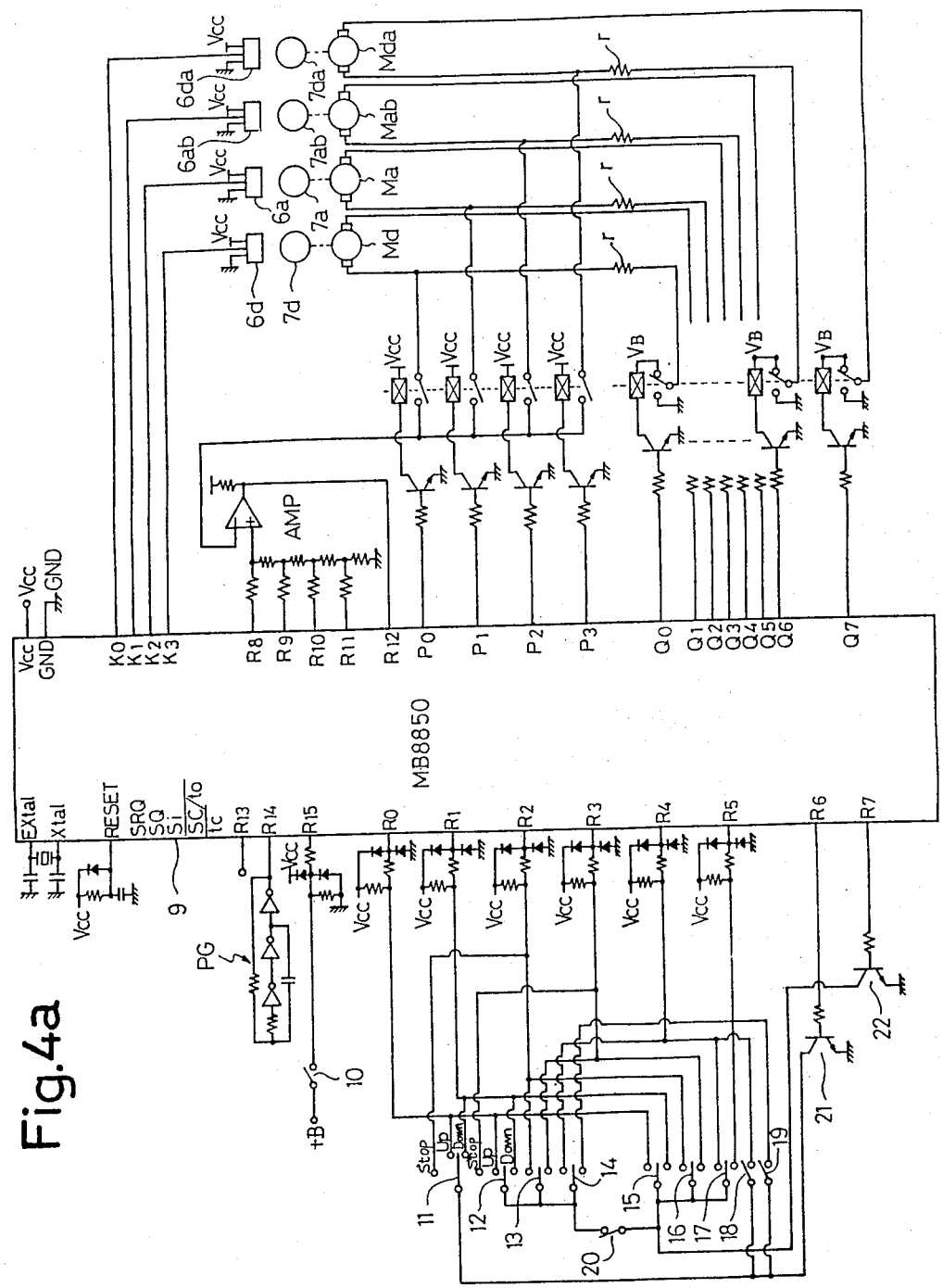
FIG. 4a is a block diagram showing a configuration of an electric control system adapted to read switch input and then actuate and control the electric-powered window opening/closing mechanism.

FIG. 4a shows a configuration of an electric control system adapted to actuate and control the electric-powered driving mechanisms for the above-mentioned four doors. The electric control system is mainly composed of a microcomputer 9, which has input ports R0 through R5 connected to key switches 11 through 20 for instructing window positions and has output ports R6 and R7 connected to transistors 21 and 22 for key-in reading. An input port R15 is connected to an automatic control setting key switch 10 which permits automatic positioning control for the side windows, and an interruption input terminal R14 is connected to an output terminal of a pulse generator PG adapted to generate clock pulses for counting time. The motors of the electric-powered driving mechanisms for the respective doors are driven by outputs from output ports Q0 through Q7 to be rotated forwardly and reversely. For instance, when a high level H is set at the output port Q0, Q2, Q4 or Q6, the motor Md (for the door adjacent to the driver's seat), the motor Ma (for that adjacent to the front passenger seat), the motor Mab (for that to the rear of the front passenger seat), or the motor Mda (for that to the rear of the driver's seat) is actuated to rotate forwardly. On the other hand, when a high level H is set at the output port Q1, Q3, Q5 or Q7, the motor Md (for the door adjacent to the driver's seat), the motor Ma (for that adjacent to the front passenger seat), the motor Mab (for that to the rear of the front passenger seat), or the motor Mda (for that rear of the driver's seat) is actuated to rotate reversely. The ring-shaped permanent magnets 7d, 7a, 7ab and 7da mechanically coupled to the motor output shafts in the worm and wheel assemblies 5 and the Hall IC units 6d, 6a, 6ab and 6da opposite to the corresponding worm and wheel assemblies constitute rotary encoders, which apply their pluse outputs to input ports K3 through K0 of the microcomputer 9, respectively.

The output from an amplifier AMP is applied to an A/D conversion input terminal R12 of the microcomputer 9, and the voltage across each of resistors r for detecting motor current is applied to the amplifier AMP via a relay. The voltage across the resistor r is proportional to the motor current or motor load. By setting a high level H at an output port P0, P1, P2 or P3, the voltage respectively in proportion to the load current of the motor Md (for the door adjacent to the driver's seat), the motor Ma (for that adjacent to the front passenger seat), the motor Mab (for that to the rear of the front passenger seat), or the motor Mda (for that to the rear of the driver's seat) is selectively applied to the microcomputer 9. Data (4 bits) for setting A/D conversion range is set at output ports R8 through R11.

Each of the electric circuits is supplied with constant voltage Vcc from a power supply circuit as shown in FIG. 4b.

Figure 4C:
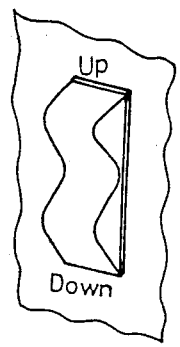
Figure 5A:
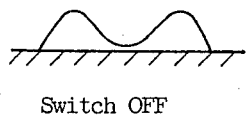
FIGS. 5a, 5b, 5c and 5d are side views showing the normal state and the operated states of such switch.
Figure 5B:
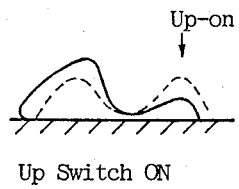
Figure 5D:
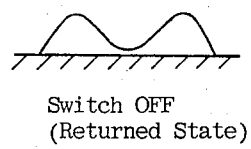
Figure 5C:
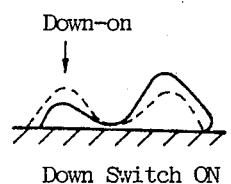

FIG. 4c shows an external appearance of one 12 among the switches 11 through 17. Other switches 13 through 17 have the same structure as the switch 12. The switch 12 is of a two-pole switch such that the up instruction side and the down instruction side are equally projected in the normal state, as shown in FIG. 5a. But when the up side is pressed down as shown in FIG. 5b, the switch is turned to bring a movable contact into abutment with one fixed contact (i.e., window opening instruction contact). In the absence of the pressing-down force, the switch is returned back to the normal state as shown in FIG. 5d, thereby to allow the movable contact to return back to the neutral position where it comes into no abutment with either fixed contact. On the other hand, when the down side is pressed down as shown in FIG. 5c, the switch is turned to bring the movable contact into abutment with the other fixed contact (i.e., window closing instruction contact). In the absence of the pressing-down force, the switch is returned back to the normal state as shown in FIG. 5d, thereby to allow the movable contact to return back to the neutral position where it comes into no abutment with either fixed contact. The switch 11 has substantially same mechanical structure as that of the switch 12, but it has additional two flexible contacts, one of which serves as a window opening instruction contact and the other of which serves as a window closing instruction contact, and two fixed contacts are used as stop instruction contacts. This switch 11 is so arranged that when the up side is rather slightly pressed down, a movable contact comes into abutment with the flexible window opening instruction contact to instruct the forward rotation of the motor, and when the up side is strongly pressed down, the movable contact comes into abutment with one stop instruction contact while keeping abutment with the flexible window opening instruction contact, thereby to instruct stopping of the motor. Meanwhile, when the down side is rather slightly pressed down, the movable contact comes into abutment with the flexible window closing instruction contact to instruct the reverse rotation of the motor, and when the down side is strongly pressed down, the movable contact comes into abutment with the other stop instruction contact while keeping abutment with the flexible window closing instruction contact, thereby to instruct stopping of the motor.

The switches 18 and 19 are mounted in a key hole formed in the driver's door. When an unlocking key is inserted into the key hole and turned in the locking direction, the switch 18 is closed to instruct the microcomputer 9 to close the window to the door rear of the driver's seat. When the unlocking key is inserted into the key hole and turned in the unlocking direction, the switch 19 is closed to instruct the microcomputer 9 to open the window in the door to the rear of the driver's seat.

The microcomputer 9 incorporates therein a program which executes initialization in response to energization of the power supply, detection of limit position and current position in responce to closing of the switch 10, reading of operation of the switches 11 through 19 for instructing window positioning, as well as window control instructed by the switch operation. Control operation in accordance with this program is summarized as follows.

A. When the source voltage Vcc is applied, all of the input/output ports and internal registers (including those for counting and setting flags) are initialized. The output ports are set in such a state where all motors are stopped.

B. The microcomputer waits for the window control instruction (the input port R15=H: the switch 10 closed). When R15 indicate a high level H or becomes H, it waits for operation of the switches 11 through 19 for instructing window opening/closing. When there occurs the switch operation, both limit position detection and current position detection as well as decoding of the switch operation are started.

C. Both limit position detection and current position detection are carried out for the electric-powered driving mechanism for the side window corresponding to the switch which has been operated first of all. During execution of this flow, operation of other switches will not be read, but stop instruction of the switch 11 is read at all times, and when this instruction is issued, the motor is stopped to clear the processed state up to that time. At the completion of both limit position detection and current position detection, a positioning flag Ei (the number of i represents the corresponding window under control) is set. This flag is held when the source voltage is being applied. In the presence of the flag, both limit position detection and current position detection will not be performed, and there will be executed window opening/closing control that permits positioning of the window glass at a position in accordance with the decoded result of the switch operation.

D. Decoding of the key switch operation begins upon starting of the switch operation to decode the repeated closing/opening mode of the same switch, thereby to prepare the data instructing an opening/closing degree of window (full closing, ⅓ opening, ½ opening, ⅔ opening and full opening). This data is set as a goal value.

E. Since a driving speed of the glass 2 is relatively low, the motor starts to be driven from the beginning of the switch operation and, after completion of decoding the switch operation within a predetermined time, driving of the motor is continued until the actual position of the glass reaches the goal position. But when the switch operation is not decoded within the predetermined time, driving of the motor is stopped.

F. Since the switches 11 through 17 are respectively allocated to the windows to be controlled, one of the input ports K0 through K3 and one of the output ports P0 through P3 are selected in accordance with the operated switch, so that the Hall IC unit 6i of the rotary encoder coupled to the motor to be driven is set in the reading mode and the resistor r connected to the motor is set in the A/D conversion reading mode. Depending on the switch number and which side (up side or down side) is closed, one of the output ports Q0 through Q7 is specified and a high level H is set at the specified port.

G. When the motor is set in the driving mode in the above F, either up count (forward rotation : rising of the glass) or down count (reverse rotation : falling of the glass) is decided based on the rotating direction of the motor. The number of output pulses from the Hall IC unit is counted to monitor the current position, while monitoring the load through A/D conversion of the motor current. A movement range of the glass is judged from the current position and the reference data allocated to the range which is read out of the internal ROM and compared with the A/D converted data. In the event of overload, the motor is stopped. The motor is also stopped when the current position coincides with the goal position.

In reading of the key switches in the above step D, operations of one group including the switches 11, 18 and 19 and the other group including the switches 12 through 17 are read in a time sharing manner. More specifically, the transistors 21 and 22 are turned on alternately, so that with the transistor 21 being on, the input ports R0 through R5 are allocated to read the operation data of the switches 11, 18 and 19, while with the transistor 22 being on, the input ports R0 through R5 are allocated to read the operation data of the switches 12 through 17.

Table 1 shows the correlation between the operation of the switches 11 through 19 and the state of the input-/output ports as well as the instructed content. When any one of the cases No. 1 through 12 shown in Table 1 appears at one of the input ports R0 through R7, the microcomputer 9 starts to read the switch operation mode and, at the same time, makes reference to the reference point deciding flag E (refer to Table 7). In the absence of the reference point deciding flag E corresponding to the case number, the flow proceeds to deciding of reference point, and in the presence of the flag E, it proceeds to window opening/closing control. In the switch operation mode, input to the input ports R0 through R7 is first read and then the data A as shown in Table 2 is stored in a register. This data A is held until the completion of reference point deciding or window opening/closing control, but when the switch operation is not of the predetermined mode, the window control flag is cleared and window opening/closing control is stopped at that time. In case deciding of reference point has been started, the data A is not cleared nor is the reference point deciding mode stopped. With power being applied and the switch 10 being closed, when deciding of reference point is once executed for one of the windows, the flag E indicating the completion of reference point deciding during the powered-on time irrespective of opening/closing of the switch 10. Thus, deciding of reference point is not carried out once again.

In reading of the switch operation (i.e., input reading), the microcomputer 9 monitors the switch operation to prepare the data B (refer to Table 3). When this data B corresponds to any one of the switch operation modes shown in Table 4, i.e., any one of the data Ba through Bc shown in Table 3, reading of the switch operation (i.e., input reading) is completed and either reference point deciding control or window opening/closing control is started entirely. If the data B does not correspond to the predetermined one (any one of the data Ba through Bc), the window control flag is cleared when under window opening/closing control, thereby to stop the control and clear the data B, while when under reference point deciding control the data is cleared but the control is continued, as previously noted.

After the completion of reference point deciding, the reference point data D (refer to Table 6) in accordance with the data A is memorized in a register. More specifically, the reference point data Dd in case of reference point deciding in response to the up or down operation of the switch 11, the reference point data Da in case of reference point deciding in response to the up or down operation of the switch 15, the reference point data Dab in case of reference point deciding in response to the up or down operation of the switch 16, or the reference point data Ddb in case of reference point deciding in response to the up or down operation of the switch 17, is memorized in the corresponding allocated register (refer to Table 6).

During driving of the motor, the current position data is memorized in the current position register (refer to Table 5) allocated to the associated motor (i.e., window of the respective seats) and then updated. More specifically, every time the output from the Hall IC unit (one of 6d, 6a, 6db and 6ab which corresponds to the motor being driven) is changed from H to L or reversely, the content of the current position register is updated in the 1-increment mode in case of forward actuation and in the 1-decrement mode in case of reverse actuation.

TABLE 1

| Case No. | Control Switch | Closed Contact | R7 | R6 | R5 | R4 | R3 | R2 | R1 | R0 | Instructed Content | Controlled Window | Symbol |
|---|---|---|---|---|---|---|---|---|---|---|---|---|---|
| 1 | 11 | Up | L | H | H | H | H | H | H | L | Closing Drive | Door adjacent to | d |
| 2 | 11 | Down | L | H | H | H | H | H | L | H | Opening Drive | driver's seat | |
| 3 | 11 | Stop | L | H | H | H | H | L | H | H | Stop | All doors | |
| 4 | 11 | Stop | L | H | H | H | L | H | H | H | Stop | | |
| 5 | 18 | Up | L | H | H | L | H | H | H | H | Closing Drive | Door rear of | db |
| 6 | 19 | Down | L | H | L | H | H | H | H | H | Opening Drive | driver's seat | |
| 7 | 15 | Up | H | L | H | H | H | H | H | L | Closing Drive | Door adjacent to | a |
| 8 | 15 | Down | H | L | H | H | H | H | L | H | Opening Drive | assistant driver's seat | |
| 9 | 16 | Up | H | L | H | H | H | L | H | H | Closing Drive | Door rear of assistant driver's seat | ab |
| 10 | 16 | Down | H | L | H | H | L | H | H | H | Opening Drive | | |
| 11 | 17 | Up | H | L | H | L | H | H | H | H | Closing Drive | Door rear of driver's seat | db |
| 12 | 17 | Down | H | L | L | H | H | H | H | H | Opening Drive | | |

TABLE 2

DATA A

| R7 | R6 | R5 | R4 | R3 | R2 | R1 | R0 |
|---|---|---|---|---|---|---|---|
| | | | | | | | |

TABLE 3

Data B

| B3 | B2 | B1 | B0 |
|---|---|---|---|
| | | | |

Data Ba

| B3 | B2 | B1 | B0 | |
|---|---|---|---|---|
| L | H | L | H | Full closing upon up instruction, Full opening upon down instruction |

Data Bb

| B3 | B2 | B1 | B0 | |
|---|---|---|---|---|
| L | H | H | L | ½ closing upon up instruction, ½ opening upon down instruction |

Data Bc

| B3 | B2 | B1 | B0 | |
|---|---|---|---|---|
| L | H | H | H | ¼ closing upon up instruction, ¼ opening upon down instruction |

TABLE 4

Data Ba: Switch operation mode that after being once closed, the switch is closed once again after the lapse of time not shorter than 1 sec.
Data Bb: Switch operation mode that after being once closed, the switch is closed once again within 1 sec and then closed again after the lapse of time not shorter than 1 sec.
Data Bc: Switch operation mode that after being closed once, the switch is closed once again within 1 sec, then closed once again within another 1 sec and then closed again after the lapse of time not shorter than 1 sec.

TABLE 5

| Current Position Data C | |
|---|---|
| Window position data Cd for door adjacent to driver's seat: | 8 bits |
| Window position data Ca for door adjacent to assistant driver's seat: | 8 bits |
| Window position data Cdb for door rear of driver's seat: | 8 bits |
| Window position data Cab for door rear of assistant driver's seat: | 8 bits |

TABLE 6

| Reference Point Data D | |
|---|---|
| Reference point data Dd for door adjacent to driver's seat | |
| First position data Dd1: | 8 bits |
| Second position data Dd2: | 8 bits |
| Third position data Dd3: | 8 bits |
| Reference point data Da for door adjacent to assistant driver's seat | |
| First position data Da1: | 8 bits |
| Second position data Da2: | 8 bits |
| Third position data Da3: | 8 bits |
| Reference point data Ddb for door rear of driver's seat | |
| First position data Ddb1: | 8 bits |
| Second position data Ddb2: | 8 bits |
| Third position data Ddb3: | 8 bits |
| Reference point data Dab for door rear of assistant driver's seat | |
| First position data Dab1: | 8 bits |
| Second position data Dab2: | 8 bits |
| Third position data Dab3: | 8 bits |

NOTE:
Zero position corresponds to the fully closed position and the data represents a value of 0, which is not memorized.
Third position corresponds to the fully opened position.

TABLE 7

| Reference Point Deciding Flag E | |
|---|---|
| Reference point deciding flag Ed for door adjacent to driver's seat: | 1 bit |
| Reference point deciding flag Ea for door adjacent to assistant driver's seat: | 1 bit |
| Reference point deciding flag Edb for door rear of driver's seat: | 1 bit |
| Reference point deciding flag Eab for door rear of assistant driver's seat: | 1 bit |

NOTE:
This reference point deciding flag indicates the completion of reference point deciding. The reference point deciding flag F indicates that deciding of reference point has been started.

TABLE 8

| Reference Data (Fixed data stored in ROM) | |
| --- | --- |
| Data I0: | Motor current value when window glass is driven from the closed state in the opening direction and glass reaches the fully closed position. |
| Data I1: | Motor current value when glass is continuously driven in a range where it comes into no abutment with weather strip. |
| Data I2f: | Motor current value when glass is in abutment with weather strip under the compressible state. |
| Data I2: | Motor current value when weather strip is fully compressed (i.e., glass is fully closed). |

Figure 6A:
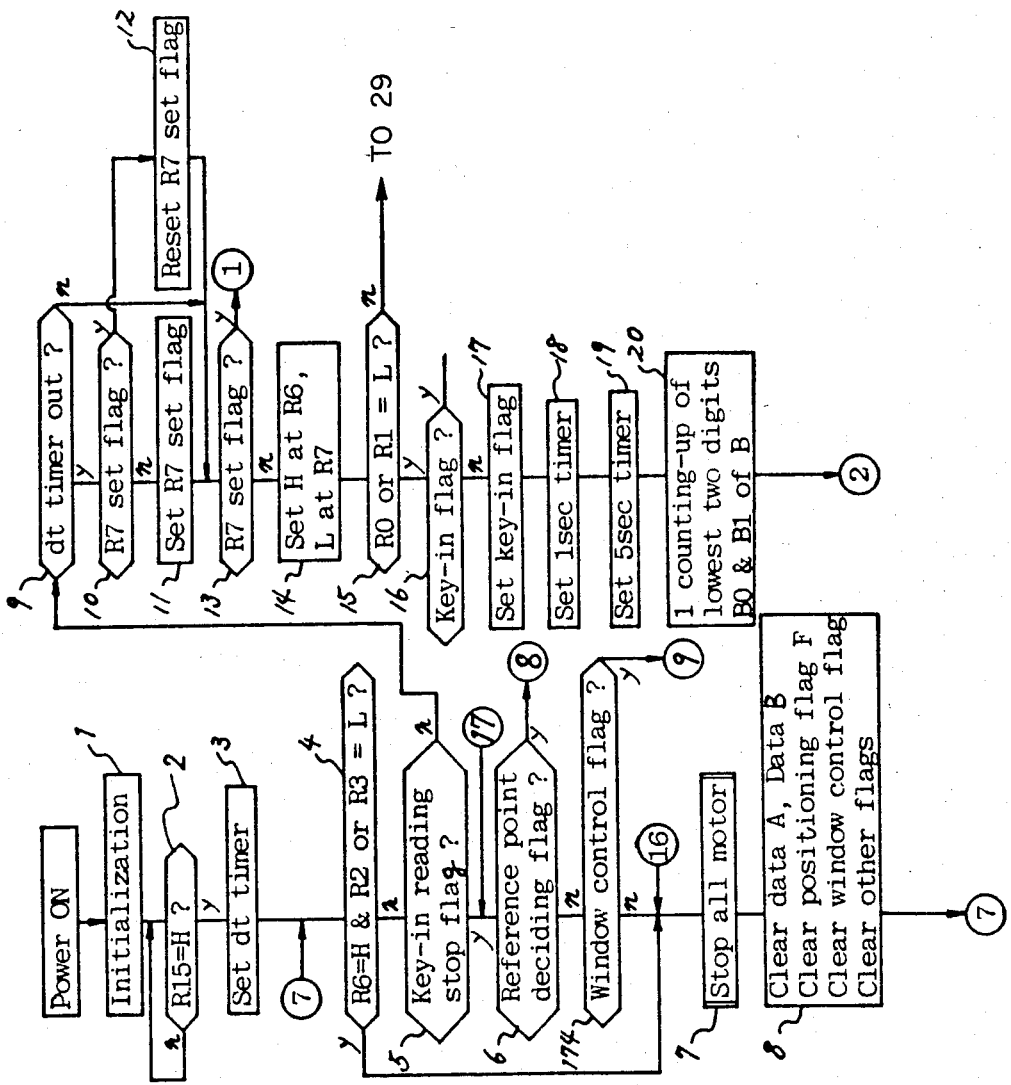
Figure 6A:
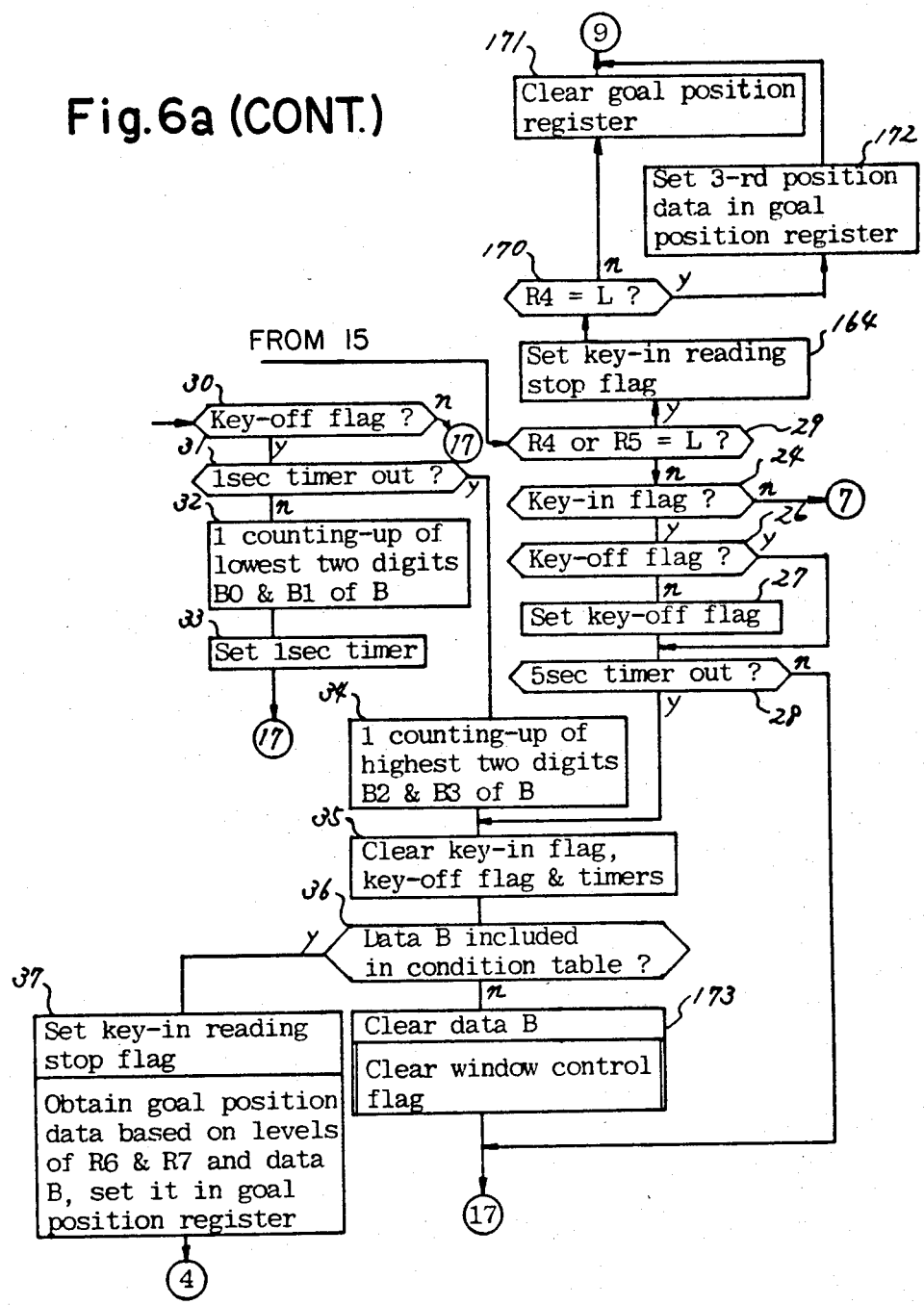
Figure 6B:
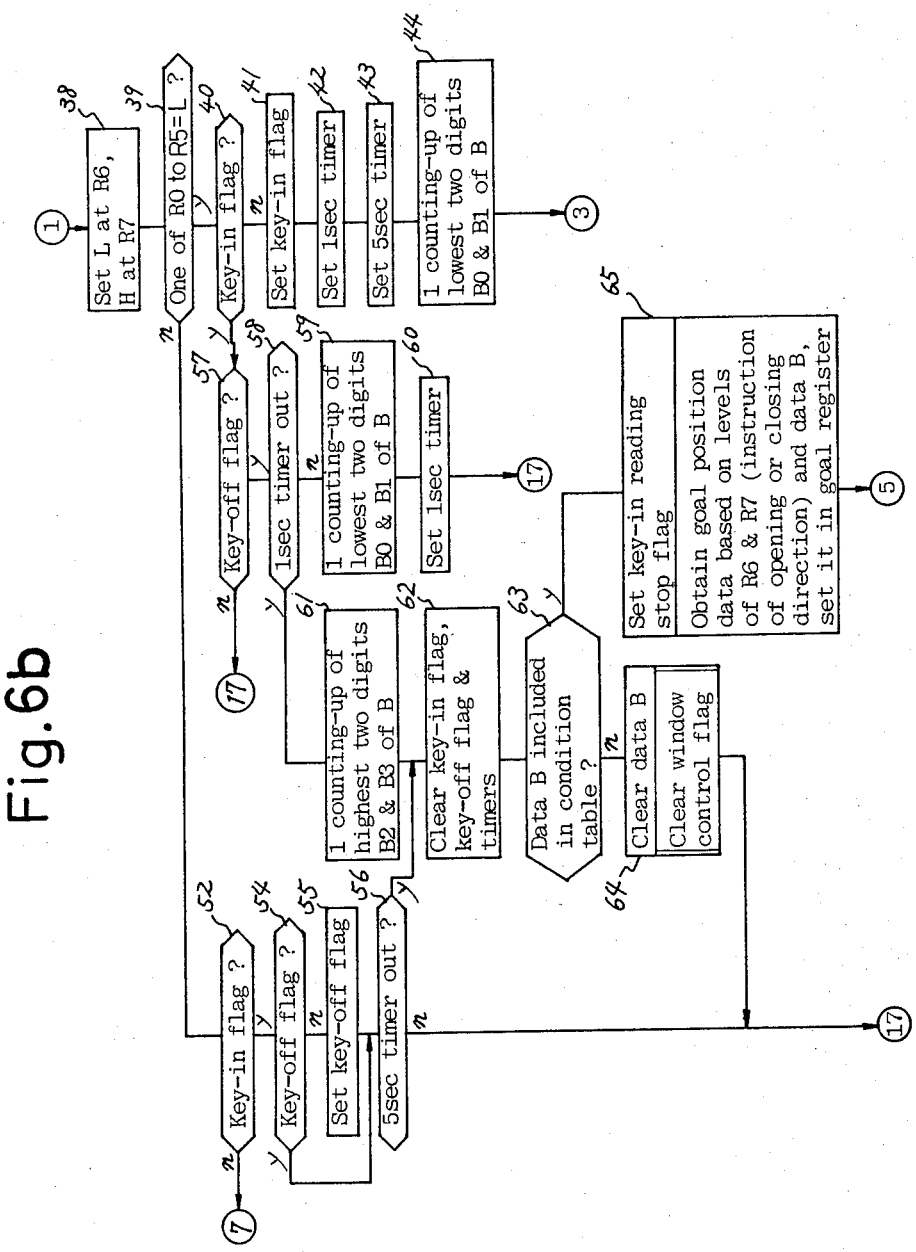
Figure 6C:
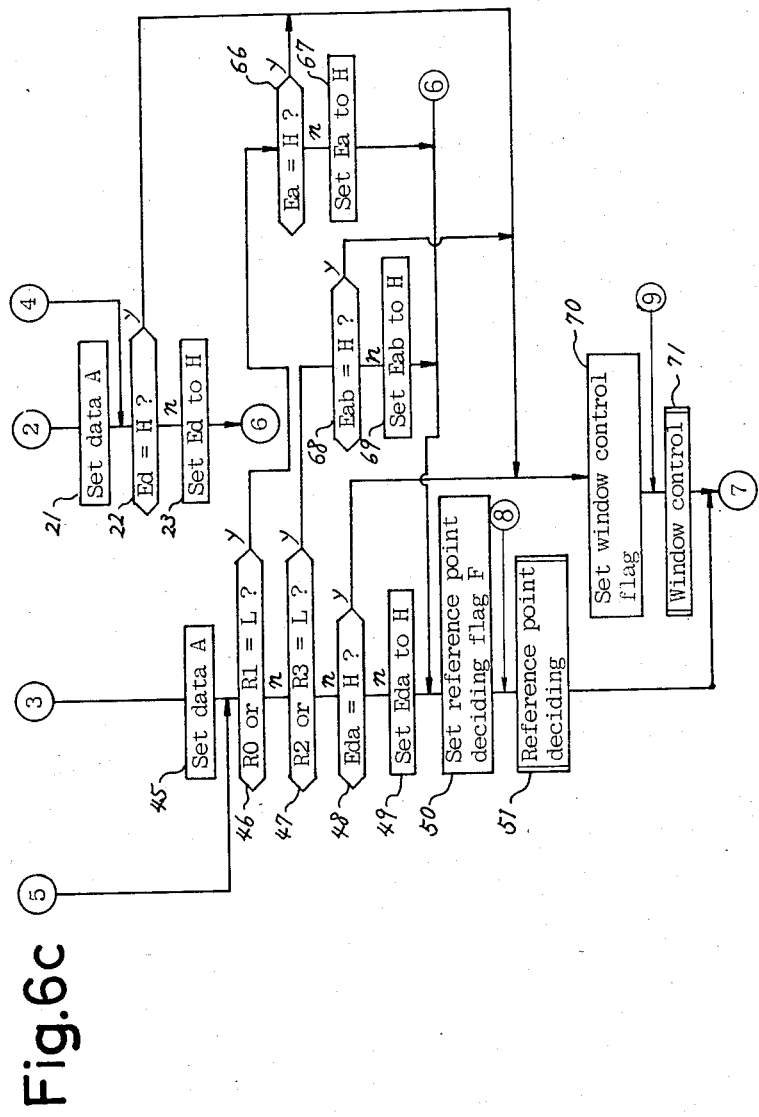
Figure 7A:
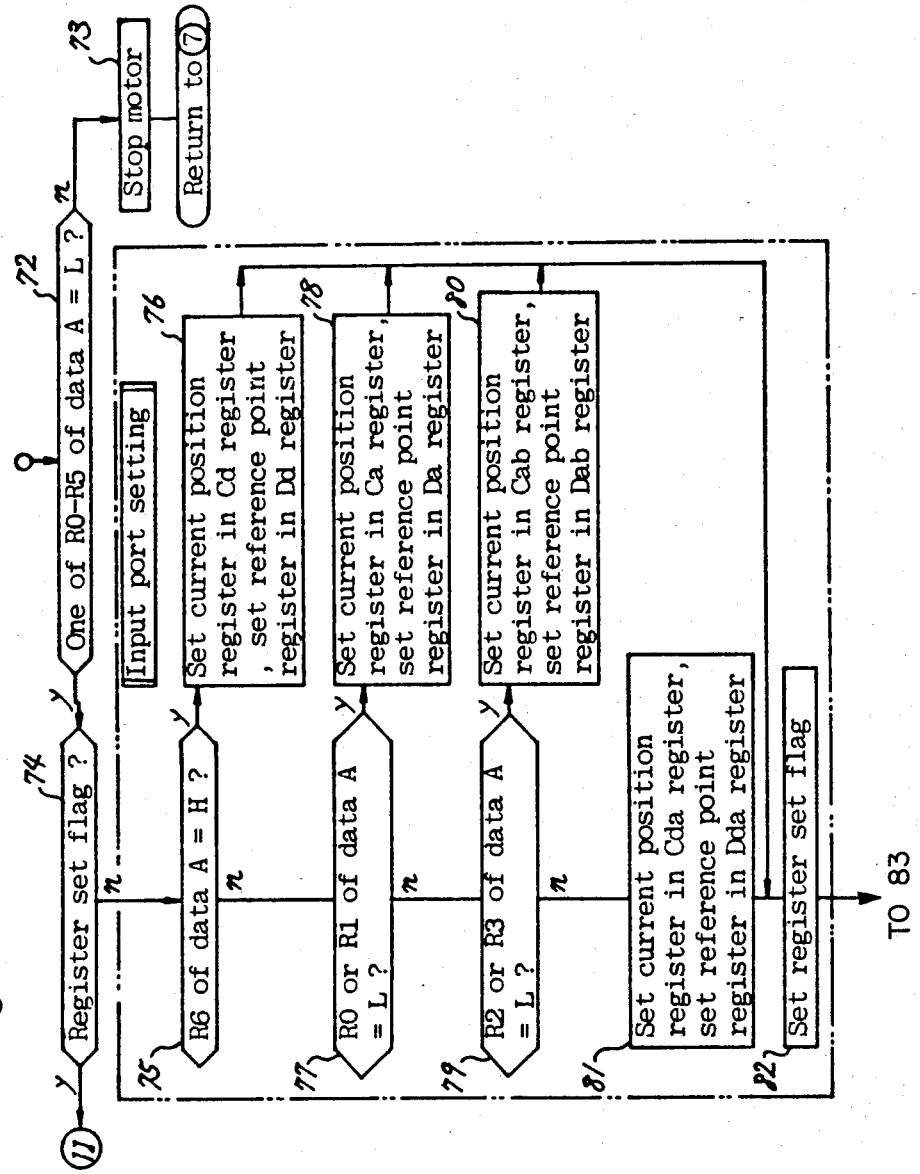
Figure 7A:
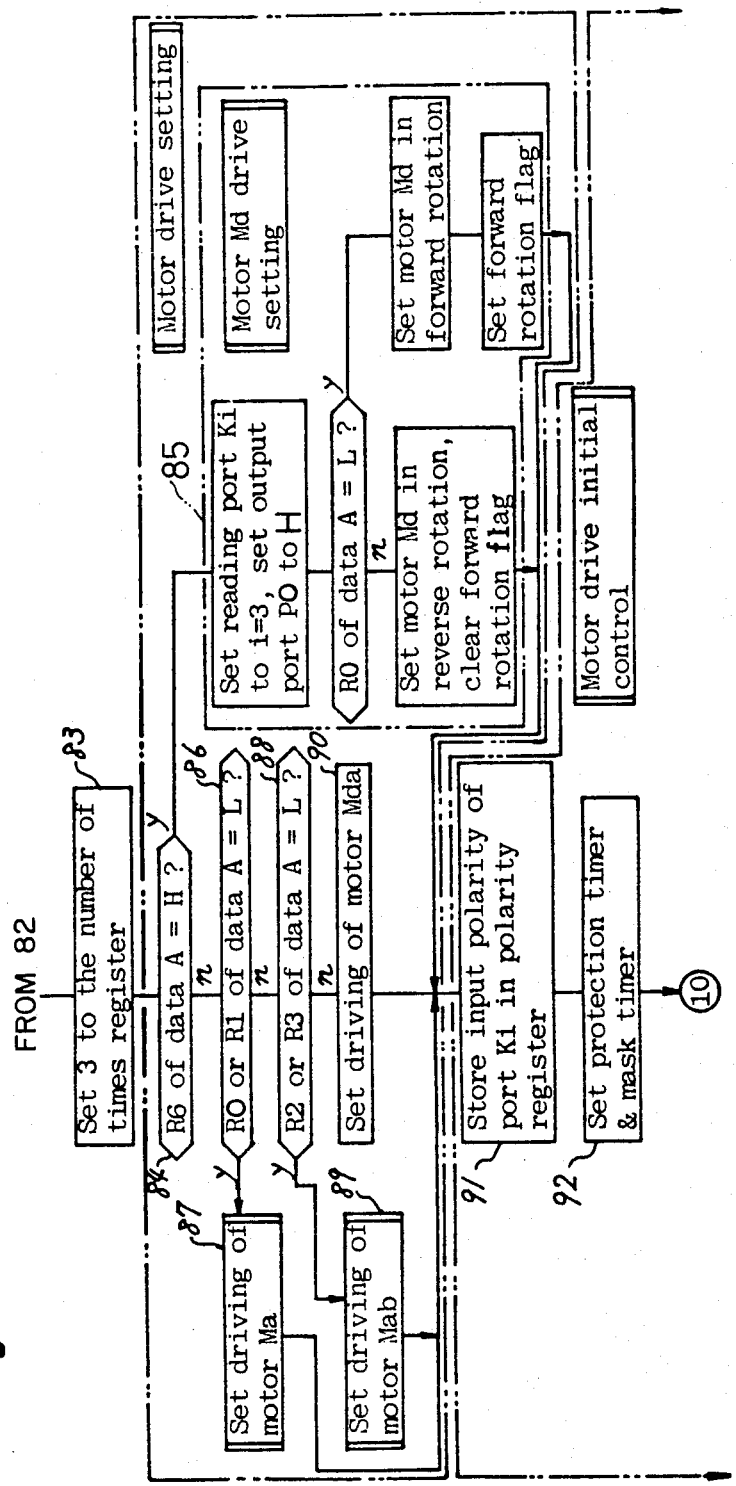
Figure 7B:
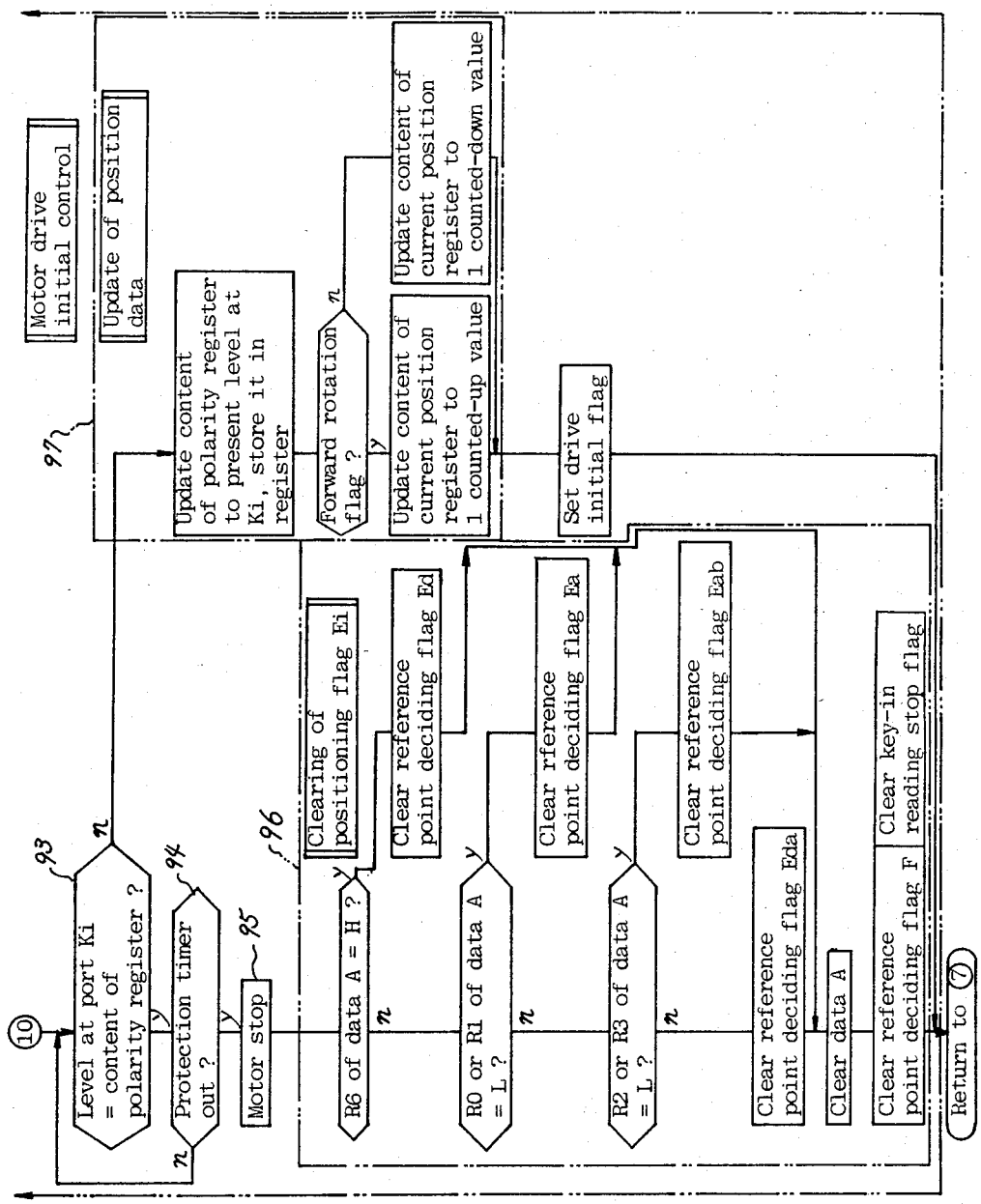
Figure 7C:
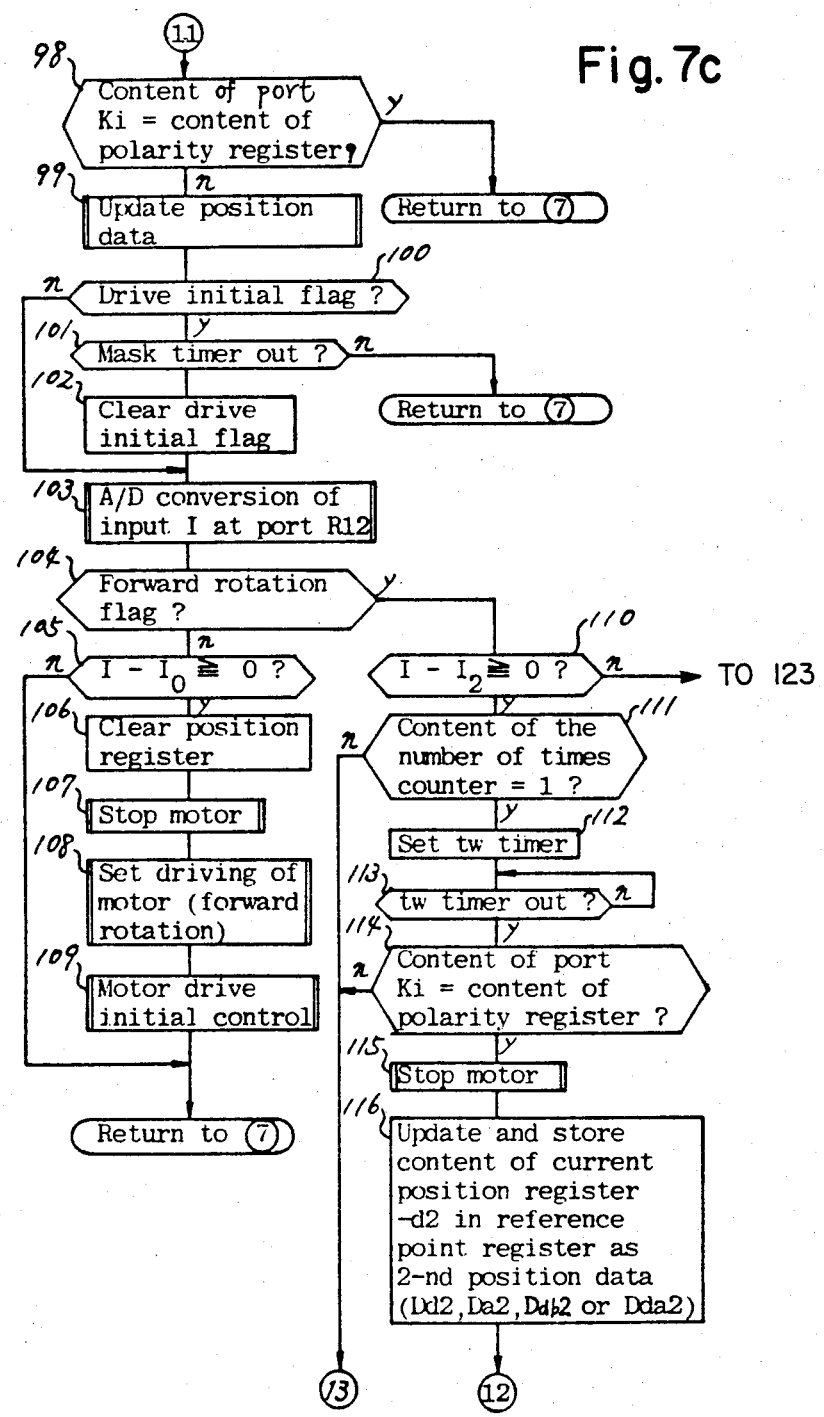
Figure 7C:
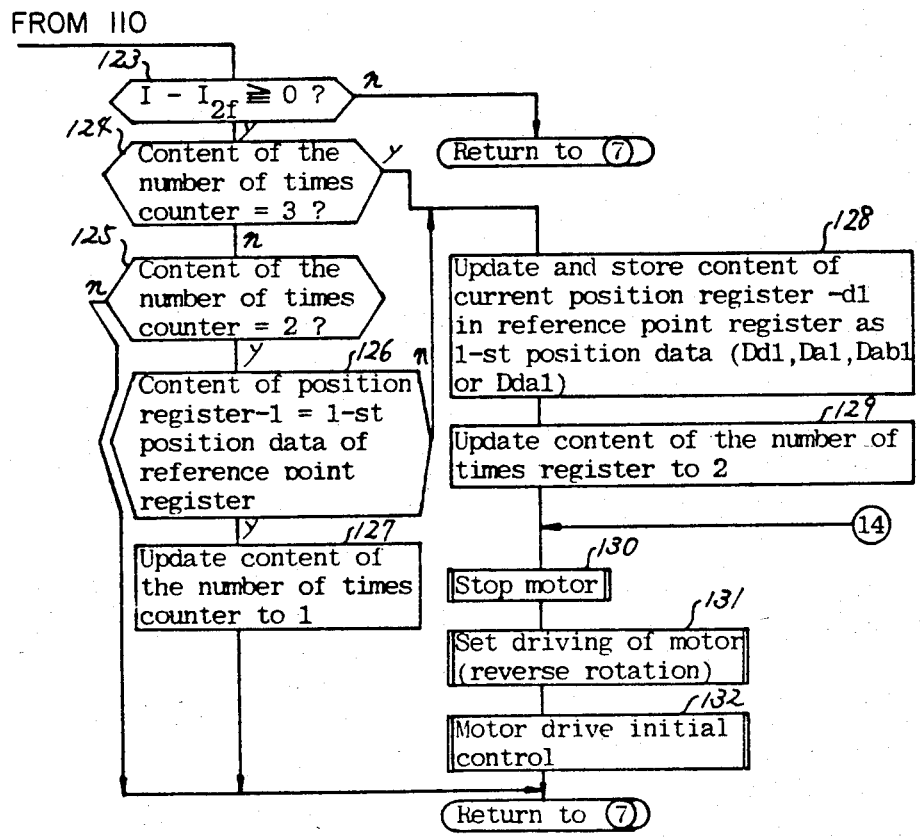
Figure 7D:
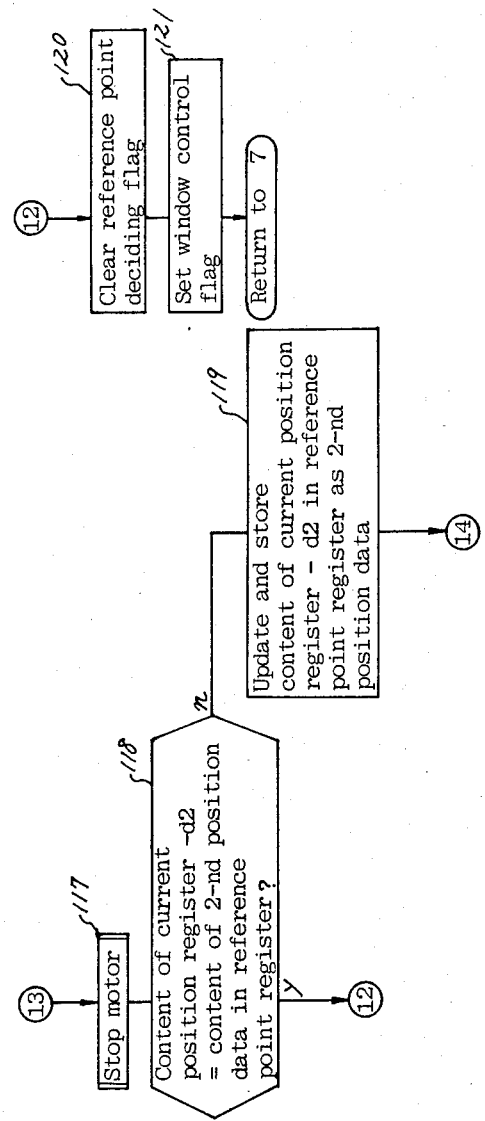
Figure 8B:
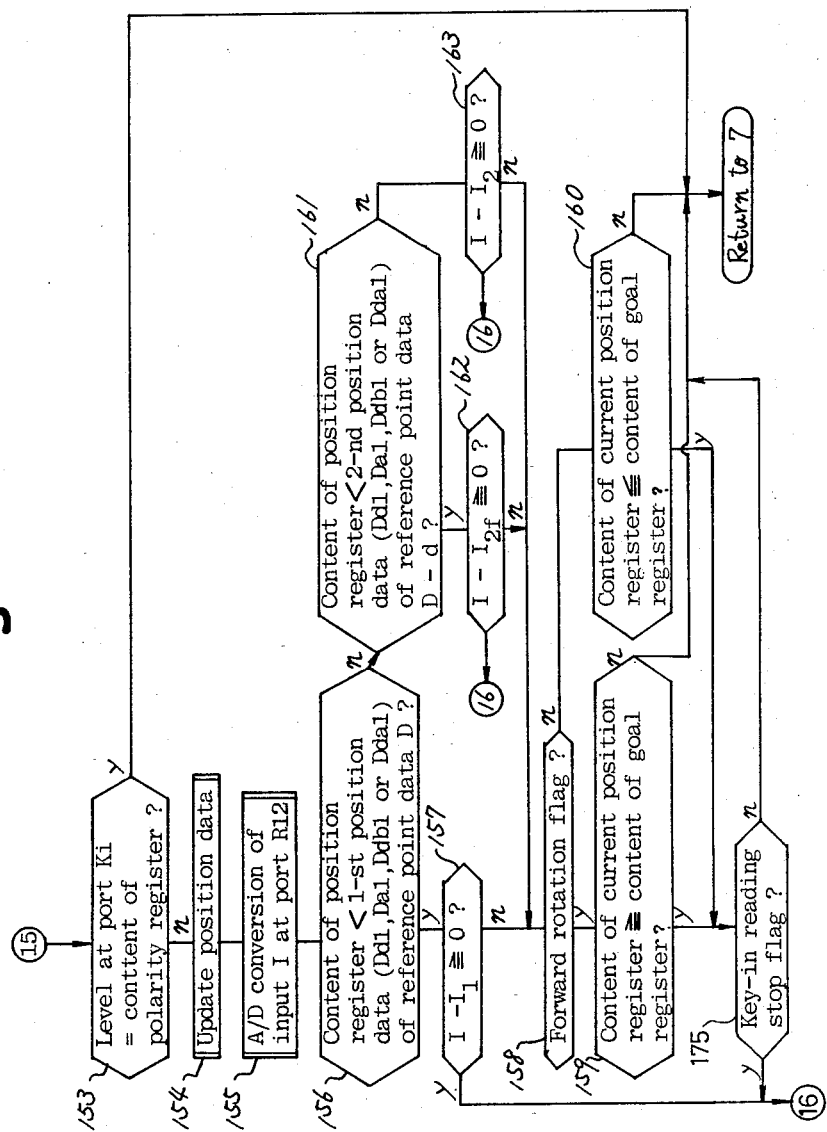

FIGS. 6a through 6c show control operation (main flow) of the microcomputer 9 with main attention on reading of switch input, FIGS. 7a through 7d show reference point deciding control operation (subflow), and FIGS. 8a and 8b show window opening/closing control operation (subflow). Control operation of the microcomputer 9 will be explained in detail hereinafter with reference to those figures.

Referring first to FIG. 6a, when the source voltage (Vcc) is applied, the microcomputer 9 initializes the input/output ports and the internal registers. With this, the output ports are set such that all motors come into the stopped state.

Then, a signal level at the input port R15 is read. If the signal level offers a low level L (or if the switch 10 is opened), the microcomputer 9 waits for it to turn to a high level H. Accordingly, with the switch 10 being opened, automatic control of window opening/closing will not be carried out.

When a level at the input port R15 is H or turns to H, the microcomputer 9 sets a timer (dt timer : program timer) which makes interruption and returns after counting-up if 1 pulse reaches an interruption input terminal R14, and which sets a timeover flag and returns if it reaches the set count value (or set time limit) which has the time limit of short time dt and determines the sharing time limit for time sharing reading of the switch group, and then goes into a step 4 and subsequent steps.

In the step 4, the set data at the output port R6 (H: reading of the group of switches 11, 18 and 19, L: no reading of this group) is referred. With the port R6 being H, signals at the input ports R2 and R3 are read and, if either one of these signals assumes L, the flow comes into a step 7 where all motors are made stopped (i.e., L is set to all of the output ports Q0 through Q7). Further, the state data which has been set up to that time and which has become not fit for the current condition due to interrupt stop of the motor, is cleared completely.

As described later, since the flow returns to the step 4 every time the program of one cycle has been executed, all motors are stopped irrespective of the control state if the switch is pressed strongly (or deeply) in the up or down direction. Therefore, it is enough for the driver just to press the switch 11 strongly in the event he feels any anomaly in driving of the window.

In this connection, the switches 11 through 14 are mounted in the door adjacent to the driver's seat, while the switches 15 through 17 are respectively mounted in the door adjacent to the assistant driver's seat, the door rear of the assistant driver's seat and the door rear of the driver's seat in this order.

The description will be continued by returning to the step 4 once again. When the condition of R6=H and R2 or R3=L is not met, the flow comes into a step 5 where it is referred whether or not there exists "a key-in reading stop flag" which indicates the completion of key-in reading. In other words, this flag indicates such a state that both key-in reading and decoding of the key operation have been completed and the corresponding control operation is ready to start or has started. The control operation is divided into reference point deciding control and window (opening/closing) control, the former control being set in the presence of "the key-in reading stop flag" and the reference point deciding flag, and the latter control being set in the absence of the reference point deciding flag. Accordingly, in the presence of "the key-in reading stop flag", the flow comes into a step 6 and then proceeds to reference point deciding control in a step 51 with the reference point deciding flag being set in the step 6 or to window control in a step 71 with the reference point deciding flag being not set.

Description will be now continued by returning to the step 5. With "key-in reading stop flag" being not set in the step 5, the flow comes into a step 9 where the state data of the dt timer is referred. If not overtimed, the flow comes into a step 13, but if overtimed, it is checked whether or not there exists a R7 set flag (which indicates that H is set at the output port R7 (i.e., reading for the group of the switches 12 through 17)). In the presence of the R7 set flag, this flag is cleared because the reading period for the group of the switches 12 through 17 has been passed, while in the absence of the R7 set flag, it is set because the reading period for the group of the switches 11, 18 and 19 has been passed, and then the flow comes into a step 13. If there exists the R7 set flag in the step 13, which indicates reading for the group of the switches 12 through 17, the flow proceeds to key-in reading for the group of the switches 12 through 17 as shown in FIG. 6b. On the other hand, if there exists no R7 set flag in the step 13, which indicates reading for the group of the switches 11, 18 and 19, the flow proceeds to key-in reading for the group of the switches 11, 18 and 19 in a step 14 and subsequent steps as shown in FIG. 6a.

In key-in reading for the group of the switches 11, 18 and 19, the output ports R6 and R7 are respectively set to H and L, the transistor 21 is turned on and the transistor 22 is turned off. In this state, signal levels (H or L) at the input ports R0 through R5 are read. As previously noted, since the stop instruction (R2, R3) of the switch 11 has been read in the step 4, such instruction will not be read in this reading process.

More specifically, signal levels at the input ports R0 and R1 are referred in a step 15. If either one of those levels is L, the flow proceeds to key-in reading in a step 16 and subsequent steps. If both levels are L, signal levels at the input ports R4 and R5 are now referred and, if either one of those levels is L, the key-in reading stop flag is set in a step 64. This case corresponds to the key operation from outside of the vehicle, so key-in reading is stopped and the flow proceeds to window control at once. As a result of reference to only R0, R1, R4 and R5 in the steps 15 and 29, if all levels are H, a key-in flag (which is set only at the time when the first key-in and the up or down instruction of the switch 11 are effected) is referred in a step 24. In the absence of the key-in flag, the flow returns from the step 24 to the step 4, so that the stop instruction of the switch 11 will not be read in the step 15 and subsequent steps.

As described in the above, when the switches 18 and 19 are once closed, the flow proceeds to window control immediately and the later-described decoding of the switch operation mode will not be carried out. More specifically, it is first checked in a step 170 which one of the switches 18 and 19 is closed. If the switch 18 is closed, the fully closed position (or third position) data Ddb3 is set to a goal value register in a step 172, while if the switch 19 is closed, the fully opened position (or zero position) data is set to the goal value register in a step 171 (this setting is effected by clearing the goal value register to memorize a value of 0 therein). Therefore, when the switch 18 is once closed (i.e., in case of R4=L), the motor Mdb is continuously actuated until the window in the door to the rear of the driver's seat is fully closed, while when the switch 19 is once closed (i.e., in case of R5=L), the motor Mdb is continuously actuated until the window in the door to the rear of the driver's seat is fully opened. This control flow corresponds to window control in a step 71, the flow being shown in detail in FIGS. 8a and 8b.

The description will be continued by returning to the step 15 once again. If R0 or R1=L (i.e., the switch 11 under the up-on or down-on state) in the step 15, it is checked in the step 16 whether or not there exists a key-in flag. In the absence of the key-in flag (which represents the first key input), the key-in flag is set, both 1 sec timer (similar to the dt timer) and 5 sec timer (similar to the dt timer) are set, and the highest two bits B3+B2 of the data B (refer to Table 3) are incremented or counted up by one (the above process corresponds to steps 17 through 20). Then, in a step 21 of FIG. 6c, the data A is prepared by taking into account the signal state of the input ports R7 through R0 at that time. In a next step 22, a reference point deciding flag Ed (refer to FIG. 7) is referred. In the presence of this flag, which indicates that reference point deciding for the window in the driver's door has been already effected after powered-on of the supply source Vcc, a window control flag is set in a step 70 so that the flow proceeds to window control in a step 71 and then returns to the step 4 after that. If the reference point deciding flag Ed is L in the step 22, (which indicates that deciding of reference point is not yet effected after powered-on of the supply source Vcc), the reference point deciding flag Ed is set (i.e., H is memorized) and another reference point deciding flag F, which indicates that deciding of reference point has started, is set in a step 50. Subsequently, the flow proceeds to deciding of reference point in a step 51 and then returns to the step 4 after that.

Returning to the step 4, the flow proceeds again up to the step 16 in a manner similar to the foregoing. But since the key-in flag is now set in the step 16, the flow proceeds through the steps 16 - 30 - ⑰ - 6, further goes into the step 51 or 71 from the step 6 and returns to the step 4 after that. Namely, the flow circulates through a loop comprising the steps 4 - 5 - 9 - . - 13 - 14 - 15 - 16 - 30 - 6 - 51 or 71 - 4. During this circulation, if the switch 11 is once opened, the flow proceeds from the step 15 through steps 29 - 24 - 26 to a step 27 where a key-off flag is set. And it now circulates a loop comprising the steps 28 - 6 - 51 or 71 - 4 - 5 - 9 - . . - 13 - 14 - 15 - 29 - 24 - 26 - 28. During this circulation, if the switch 11 is closed once again, the flow now proceeds through the steps 15 - 16 - 30 to a step 31 where the state data of the 1 set timer is referred. When not overtimed, the lowest two bits B0+B1 of the data B (refer to Table 3) are incremented or counted up by one in a step 32 and the 1 sec timer is set (once again) in a step 33. Then, the flow proceeds through the steps 6 - 51 or 71 - 4 - . When overtimed, the highest two bits B2+B3 of the data B (refer to Table 3) are incremented or counted up by one in a step 34, and the key-in flag, the key-off flag and the timer are cleared in a step 35 to complete key-in reading. Then, the data B is compared with the condition table (i.e., fixed data stored in ROM) in a step 36. If the data B coincide with one included in the condition table, the key-in reading stop flag is set in a step 37 and the goal position data is attained based on both data A and data B to be memorized in the goal register. If the data B does not coincide with any in the condition table, the flow comes into a step 173 where both data B and window control flag are cleared and then proceeds to the step 6. Thereafter, it comes into the step 7 through the step 51 in the presence of the reference point deciding flag or through the step 174 in the absence of the same.

As a result of the above-mentioned key-in reading, only when the data B coincide with the data Ba, Bb or Bc shown in Table 3, i.e., only when the key-in operation corresponds to one of the modes shown in Table 4, the key-in reading is completed and the key-in reading stop flag is set. When the key-in operation mode is one other than those, key-in is neglected and, if window opening/closing control has already started, all motors are stopped through a loop comprising the steps 173 - 6 -174 - 7. Since the reference point deciding flag is not cleared, deciding of reference point is continued.

The above-mentioned reading of up-on and down-on of the switch 11 as well as reference point deciding control or window opening/closing control in parallel are similarly carried out in response to up-on and down-on of the remaining switches 12 through 17. The reading control flow thereof is shown in FIG. 6b.

In this connection, the goal position data is set as follows.

(1) Data B=Ba (refer to Table 3)

In case the data A offers the up instruction (R0, R2 or R4=L), the goal position data is set as the third position data (refer to Table 6) while in case of the down instruction (R1, R3 or R5=L), the goal position data is set as the zero position data (i.e., the goal position register is cleared).

(2) Data B=Bb (refer to Table 3)

In both cases the data A offers the up instruction (R0, R2 or R4=L) and the down instruction (R1, R3 or R5=L), the goal position data is set as the data showing a ½ value of the third position data (refer to Table 6).

(3) Data B=Bc (refer to Table 3)

In case the data A offers the up instruction (R0, R2 or R4=L), the goal position data is set as the data showing a ⅓ value of the third position data, while in case of the down instruction (R1, R3 or R5=L), the goal position data is set as the data showing a ⅔ value of the third position data.

Hereinafter there will be described "reference point deciding" control as shown in FIGS. 7a through 7d. Having entered deciding of reference point, the flow proceeds to input port setting in steps 75 through 82 via steps 72 and 74. In this input port setting, the data A is referred. If R6 of the data A is H (i.e., in occasion of the cases Nos. 1 and 2 because the cases Nos. 1 through 6 in Table 1 meets that condition but deciding of reference point will not start in the cases Nos. 3 through 6), the current position register (adapted to memorize the window opening/closing position: refer to Table 5) is specified as a Cd register allocated for the motor Md, the register adapted to memorize the reference point is specified as a Dd register (refer to Table 6) (in a step 76), and a register set flag is set (in a step 82). In case of R6=L, this indicates that R7=H is established and any one of the switches 15 through 17 has been operated, so that current position register is set as a Ca register and the reference point register is set as a Da register through a step 77 or 79 if R0 or R1=L (i.e., the switch 15 is closed). If R2 or R3=L (i.e., the switch 16 is closed), the current position register is set as a Cab register and the reference point register is set as a Dab register through a step 79. Further, if R4 or R5=L (i.e., the switch 17 is closed ), the current position register is set as a Cdb register and the reference point register is set as a Ddb register in a step 81. In any case, the register set flag is set and 3 is set in the number of times counter (or register) in a step 83. Then, the flow proceeds to motor drive setting in steps 84 through 90.

In the motor drive setting, the input port (one of K3 through K0) in accordance with the data A is set to reading of rotation signal, and H is set at the output port (one of Q0 through Q7) in accordance with the data A. Then, in accordance with the data A a forward rotation flag is set in case of the forward rotation, or it is cleared in case of the reverse rotation. For instance, when the data A indicates closing of the switch 11, as shown at 85 encircled by two-dot chain lines, reading of rotation signal is set at the port K3 and, if up-instructed (R0=L), H is set at Q0 and the motor Md is set to actuate the forward rotation and to set the forward rotation flag, while if down-instructed (R0=H, namely, R1=L), H is set at Q1 and the motor Md is set to actuate the reverse rotation and to clear the forward rotation flag. Then, the flow comes into a step 91. Actuation of other motors is set in a similar manner.

Coming into the step 91, an input level (H or L) at the rotation signal input port Ki is memorized in a polarity register, and then both protection timer and mask timer are set in a step 92. Similarly to the dt timer, these timers are each of a program timer which makes interruption and effect counting-up. By the way, the protection timer is to set a time period slightly longer than that from starting of the motor actuation to normal operation of the mechanism section. If there is no change in a signal level at the rotation signal input port Ki (i.e., the mechanism section will not go) until the time period set by this timer becomes out, this is judged as the abnormal state and the motor is made stopped. The mask timer is to set a time period from starting of the motor actuation to falling of the motor current down to the normal level. After the time period set by this timer becomes out, the later-described overload detection is started.

Now, if there occurs no change in a signal level at Ki until the protection timer is turned out, the motor is stopped through steps 93-94, the reference point deciding flag for the window (or motor) being about to undergo deciding of reference point is cleared in a step 96, and other state data are also cleared, thereafter the flow returns to the step 4 in the main routine.

On the other hand, if there occurs a change in a signal level at the port Ki until the protection timer is turned out, the flow proceeds to update of the position data in a step 97 where the content of the current position register is incremented in the presence of the forward rotation flag and is decremented in the absence of the same. Then, there is set a drive initial flag which indicates that the motor drive has started.

The flow now returns to the main routine and, after going round the steps for key-in reading, further returns to deciding of reference point once again through the step 6. Since the register set flag exists at this time, the flow comes into from the step 74 to a step 98 (FIG. 7c) from which, if a signal level at the rotation signal input port Ki is subjected to no change, it returns to the main routine so as to go round the steps for key-in reading and further returns to deciding of reference point once again through the step 6. If a signal level at Ki is subjected to a change, the position data is updated in a step 99 and then it is checked in steps 100 and 101 whether the motor starting-up period has lapsed or not. When the starting-up period has lapsed (i.e., the mask timer has been turned out) and the drive initial flag is set, the flag is cleared and the flow comes into a step 103 where the motor load undergoes A/D conversion. When the starting-up period has not lapsed, it returns to the main routine to go round the steps for key-in reading and further returns to deciding of reference point once again through the step 6.

After the completion of A/D conversion in the step 103, the direction of motor rotation is referred in a step 104. In the absence of the forward rotation flag, this indicates falling of the window, so the A/D conversion data I is compared with the reference data IO (refer to Table 8). If I is not smaller than IO, which indicates that the window glass has reached the fully opened state, the current position register is cleared (i.e., the zero position data is memorized therein) to stop the motor and then the motor is set for forward driving. Subsequently, the flow returns to the main routine through motor drive initial control to go round the steps for key-in reading and further returns to deciding of reference point once again through the step 6.

In the presence of the forward rotation flag, the A/D conversion data I is compared with the reference data I2 (refer to Table 8). If I is not smaller than I2, this indicates that the window glass has reached the fully opened state, so the flow comes into a step 117 where the motor is made stopped. If I is smaller than I2, the A/D conversion data I is compared with the reference data I2f (refer to Table 8) and, when I becomes coincident with I2f, it comes into a step 124.

When deciding of reference point has started in the reverse rotation state of the motor, the current position register is cleared at the time the window glass reaches the fully opened position (i.e., zero position), and the motor is set in the forward rotation (steps 105 through 109). Then, the flow returns to the main routine to go round the steps for key-in reading and further returns to deciding of reference point once again through the step 6. The flow now goes through the steps 104 - 110 - 123 and, when the window glass strikes against the weather strip, it comes via a step 124 into a step 128 where the value obtained by subtracting the error tolerance dl from the content of the current position register is memorized in the reference point register D (refer to Table 6) as the first position data. Through steps 129 - 130 - 131 - 132, the content of the number of times counter is updated to 2 and the motor is now set in actuation for the reverse rotation after stopping it temporarily. Then, the flow returns to the main routine to go round the steps for key-in reading and further returns to deciding of reference point once again via the step 6. This time, through the steps 104 to 109, the window glass is descended up to the fully opened position and the motor is set in actuation for the forward rotation. Then, the flow returns to the main routine to go round the steps for key-in reading and further returns to coinciding of reference point once again via the step 6. Now, through the steps 104 - 110 - 123 - 124 - 125 - 126, the glass position at the time the window glass strikes against the weather strip (i.e., the content of the current position register—d1) is compared with the first position data memorized previously. If both of them are coincident with each other, the content of the number of times counter is set to 1 in a step 127, and then the flow returns to the main routine to go round the steps for key-in reading and further returns to deciding of reference point once again via the step 6. And this time, with the motor being held in forward driving, the flow circulates through the steps 104 - 123 - 124 - 125 -main routine - . . . - 104. During this circulation, if I becomes not smaller than I2 (full closing) in the step 110, it comes into a step 111 and then into steps 112 -113 - 114, where it is checked whether the mechanism section is substantially stopped (YES in 114) or not (NO in 114). When the mechanism section is stopped, the motor is made stopped (step 115), the value obtained by subtracting d2 from the content of the current position register is memorized in the reference point register as the second position data, and the content of the current position register is memorized thereinto as the third position data. Then, the flow comes into a step 120 where the reference point deciding flag is cleared (completion of reference point deciding), and thereafter returns to the main routine. When the mechanism is not substantially stopped in the step 114, the motor is made stopped in the step 117 and the flow comes via a step 118 into a step 119 where the value obtained by subtracting d2 from the content of the current position register is memorized in the reference point register as the second position data and the content of the current position register is memorized therein as the third position data. Then, after the motor is set in reverse driving through the steps 130 - 131 - 132, the flow returns to the main routine to go round the steps for key-in reading and further returns to deciding of reference point once again via the step 6. Furthermore, the motor is stopped and now set in forward driving through the steps 104 to 109, and then the flow returns to the main routine to go round the steps for key-in reading and further returns to deciding of reference point via the step 6. Now, if I becomes not smaller than I2, i.e., the window glass is fully closed, in the step 110, the above-mentioned memorization of both the second and third data is performed. This process will be repeated until the step 114 offers YES or the step 118 offers YES. In case deciding of reference point has started in the forward rotation state of the motor, the flow first proceeds through the steps 104 - 110 - 123. Other processing is the same as that in the foregoing case where deciding of reference point has started in the reverse rotation state.

In the above-mentioned deciding of reference point, opening and closing of the window are repeated in order to attain both correct limit position and load changing position in the current state of each window. In addition to this, an opening/closing speed of the window is low, so the actual key-in operation has been ended long before the completion of reference point deciding. If the key-in operation is coincident with the predetermined mode, the key-in stop flag is set as previously noted, so that the flow returns to the main routine after the completion of reference point deciding. At this time, because there exist no reference point flag and the window control flag is set in the step 121, the flow proceeds to window control through the steps 5 - 6 - 174 in the main routine. And in the later-described window control, the window glass is driven to the position instructed by the key-in operation. If the key-in operation does not coincide with any predetermined mode, the flow will not proceed to window control because the key-in reading stop flag is not set.

Hereinafter there will be desdribed window control by referring to FIGS. 8a and 8b. In "window control", through steps 133 - 134 - 135 - 136 - 137 - 138 - 139 - 140 to 144, motor drive is set, the drive initial flag is set, the input/output ports are set, and the motor is stopped if the mechanism will not go. Then, the flow returns to the main routine to go round the steps for key-in reading and further returns to window control once again via the step 6. When returned to window control from the main routine after movement of the mechanism, the flow now goes through steps 133 - 134 - 145 - 146 - 147 - 148 - 149 - 150, where the motor drive flag is set and the drive initial flag is cleared. Then, the flow returns to the main routine to round the steps for key-in reading and further returns to window control once again via the step 6. This time, it goes through steps 133 - 151 - 153 - 154 - 155, where the current position data (i.e., the content of the current position register) is updated every time input to the input port Ki is changed, and then the motor current undergoes A/D conversion. Subsequently, through steps 156 to 163, when the current position locates in a range between the zero position and the first position, I is compared with the reference data I1 (refer to Table 8 and FIG. 3a). If I is not smaller than I1 (i.e., under abnormal load), the flow comes into the step 7 where the motor is made stopped. If not so, the content of the current position register is compared with that of the goal register. If both contents are coincident with each other, it comes into the step 7 where the motor is made stopped, in the presence of the key-in reading stop flag (i.e., when key-in reading has been already completed and the goal position data has been set) via the step 175. But if the current position does not yet reach the goal position, or in the absence of the key-in reading stop flag (i.e., when key-in reading is not yet completed and the goal position data is not set), the flow returns to the main routine to go round the steps for key-in reading and further returns to window control once again via the step 6.

When the current position locates in a range between the first position and the second position, I is compared with I2f (refer to Table 8 and FIG. 3a). If I is not smaller than I2f, this is judged as the abnormal state and the flow comes into the step 7 where the motor is make stopped, while if not so, it comes into the step 158.

When the current position locates in a range between the second position and the third position, I is compared with I2 (refer to Table 8 and FIG. 3a) because the window glass has already penetrated into the weather strip deeply and is in the state near full closing. If I is not smaller than I2, this is judged as that the glass is in the fully closed position, and the flow comes into the step 7 where the motor is stopped. But if not so, it comes into the step 158.

The maximum stroke of window driving in window control corresponds to the value represented by the third position data, while the minimum stroke thereof corresponds to $\frac{1}{3}$ of that value. Since a window driving speed is low, key-in reading has been ended in the initial stage of $\frac{1}{3}$ stroke driving. Therefore, when the key-in operation is performed in a normal manner, the window is positioned to have the instructed opening degree. When the key-in operation is not normally effected, the window control flag is cleared in the step 173, so that the flow proceeds from the step 174 to the step 7 in the main routine, where the motor is stopped.

It is to be understood that although the invention has been described with specific reference to a particular embodiment thereof, it is not to be so limited since changes and alterations therein may be made which are within the full intended scope of this invention as defined by the appended claims.

For instance, in the above-mentioned embodiment, a single microcomputer and a plurality of window opening/closing instruction switches are used for four side windows of an automotive vehicle to instruct the window opening degree utilizing a time serial opening/closing pattern of switch operation, and the plural switches are allocated to the respective windows to instruct window opening and closing independently. But this invention is not limited to such embodiment, and the time-serial opening/closing pattern may be utilized to specify the electric-powered mechanisms (such as side windows, roof panel, mirrors inside and outside of the vehicle, and seats), to instruct opening or closing thereof, or to instruct both of them including positions of the mechanisms.

Although, in the above-mentioned embodiment, overload detection and arrival to the limit position are checked by comparing the motor current with the fixed data previously memorized in ROM, it is also possible that the normal motor currents for the respective positions of the window are stored in a non-volatile read/write semiconductor memory and the value resulted from addition of tolerance to thus stored data is regarded as the reference value, that the motor current in the normal state is accessed and read out with the current position data and then added with the tolerance to prepare the reference value which is compared with the motor current at the present time, and that if the motor current is smaller than the reference value, this is judged as normal and the motor current at the present time is stored in the non-volatile read/write semiconductor memory to update the same.

Further, the pulse period or frequency of the rotary encoder may be used as a load value in place of the motor current.

According to this invention, in any case, since control for actuating the load-vehicle electric-powered equipments is specified using the time-serial pattern of the switch operation, the number of required switches is reduced and hence selection of the desired switch becomes easy. As a result, the structure of the device, particularly, both the switch connecting structure and the input-output port configuration of the microcomputer is substantially simplified.

What is claimed is:

1. A control device for driving road-vehicle electric-powered equpment comprising:
    a supporting means for supporting said equipment in a movable manner;
    an electric-powered driving mechanism for driving said equipment;
    an electric driver for actuating an electric motor in said electric-powered driving mechanism;
    a switch means for instructing driving of said electric-powered driving mechanism; and
    an electronic control device for reading a time-serial signal pattern generated in accordance with plural successive opening/closing operations of said switch means, and for actuating and controlling the electric motor in accordance with said opening/closing pattern.

2. A control device for driving road-vehicle electric-powered equipment according to claim 1, wherein said time-serial pattern is generated in accordance with opening and closing of said switch means within a predetermined time after it has been once closed.

3. A control device for driving road-vehicle electric-powered equipment according to claim 1, wherein said time-serial pattern is generated in accordance with at least one opening/closing operation of said switch means and followed by successive closing operations thereof over a predetermined time after it has been once closed.

4. A control device for driving road-vehicle electric-powered equipment according to claim 1, wherein said electronic control device determines a goal position in accordance with said time-serial pattern and then actuates and controls said motor thereby to locate said load-vehicle equipment at said goal position.

5. A control device for driving road-vehicle electric-powered equipment according to claim 1, wherein said control device further includes a signal generator coupled to said electric-powered driving mechanism for generating an electric signal which represents a current position of said driving mechanism as said driving mechanism moves during driving of said equipment, and wherein said electronic control device reads the time-serial pattern in response to operation of said switch means, determines a goal position in accordance with said time-serial pattern and actuates said motor, refers to said electric signal during such actuation to obtain information on said current position, and stops said motor at the time when the current position reaches said goal position.

6. A control device for driving road-vehicle electric-powered equipment according to claim 5, wherein said electronic control device includes a semiconductor memory, reads reference data corresponding to the current position from said semiconductor memory to compare it with the load of said electric motor, and stops actuation of said electric motor when said load exceeds a predetermined value which is determined by said reference data.

7. A control device for driving road-vehicle electric-powered equipments according to claim 6, wherein said electronic control device actuates said electric motor for forward or reverse driving and obtains information on the limit position in movement of said load-vehicle equipment, when the given conditions such as power input to said device itself or operation of the given switch are met.

8. A control device for driving road-vehicle electric-powered equipment according to claim 7, wherein said reference data corresponding to the current position comprises a first group of reference data which is referred to during movement of said road-vehicle equipment between a first limit position and a constant load changing position, and a second group of reference data which is referred to during said movement of road-vehicle equipment between said constant load changing position and a second limit position; and said electronic control device obtains information on said constant load changing position where there occurs a load change in said electric motor smaller than that at the limit position of said road-vehicle equipment, while actuating said electric motor for forward or reverse driving, and obtaining information on the limit position in movement of said road-vehicle equipment in response to meeting of the given conditions such as power input to said device itself or operation of the given switch.

* * * * *